United States Patent [19]

Colangelo et al.

[11] Patent Number: 5,296,148
[45] Date of Patent: Mar. 22, 1994

[54] REVERSE OSMOSIS WATER PURIFIER

[75] Inventors: Anthony M. Colangelo, San Diego; Kenneth N. Saunders, San Marcos, both of Calif.

[73] Assignee: Nimbus Water Systems, Inc., San Marcos, Calif.

[21] Appl. No.: 32,142

[22] Filed: Mar. 16, 1993

[51] Int. Cl.$^5$ .............................................. B01D 61/12
[52] U.S. Cl. ...................... 210/642; 210/86; 210/97; 210/257.2; 210/321.65; 210/416.3
[58] Field of Search ................ 210/416.3, 248, 634, 210/642, 644, 649, 97, 86, 195.2, 257.2, 321.65, 416.1, 416.3, 637

[56] References Cited

U.S. PATENT DOCUMENTS

| | | | |
|---|---|---|---|
| 4,160,727 | 7/1979 | Harris | 210/248 |
| 4,711,723 | 12/1987 | Bray | 210/652 |
| 4,713,175 | 12/1987 | Bray | 210/259 |
| 4,842,724 | 6/1989 | Bray et al. | 210/104 |
| 5,203,803 | 4/1993 | Schoenmeyr | 210/416.3 |

Primary Examiner—Frank Sever
Attorney, Agent, or Firm—Fitch, Even, Tabin & Flannery

[57] ABSTRACT

A water purification apparatus utilizing a reverse osmosis cartridge which supplies a measured amount of potable water to substantially fill an open top pitcher of known desired size. This free-standing apparatus includes an electric pump which withdraws water from an overhead reservoir and pumps it through prefilters and the reverse osmosis cartridge, from which a brine stream returns to the reservoir and a product water stream discharges from an overhead outlet above the pitcher. Control means monitors the level and quality of water in the reservoir and halts the operation of the pump as soon as the water level falls below a lower predetermined level which is set so that the desired measured quantity will have been delivered to the pitcher from a full reservoir. The control means also halts operation when the total dissolved solids content in the reservoir reaches a preset upper limit. The quality of the product water is also monitored and compared with the quality of the water being pumped to the reverse osmosis cartridge; a "service" indicator light is illuminated when the desired percentage of total dissolved solids is not being removed by the reverse osmosis cartridge.

15 Claims, 2 Drawing Sheets

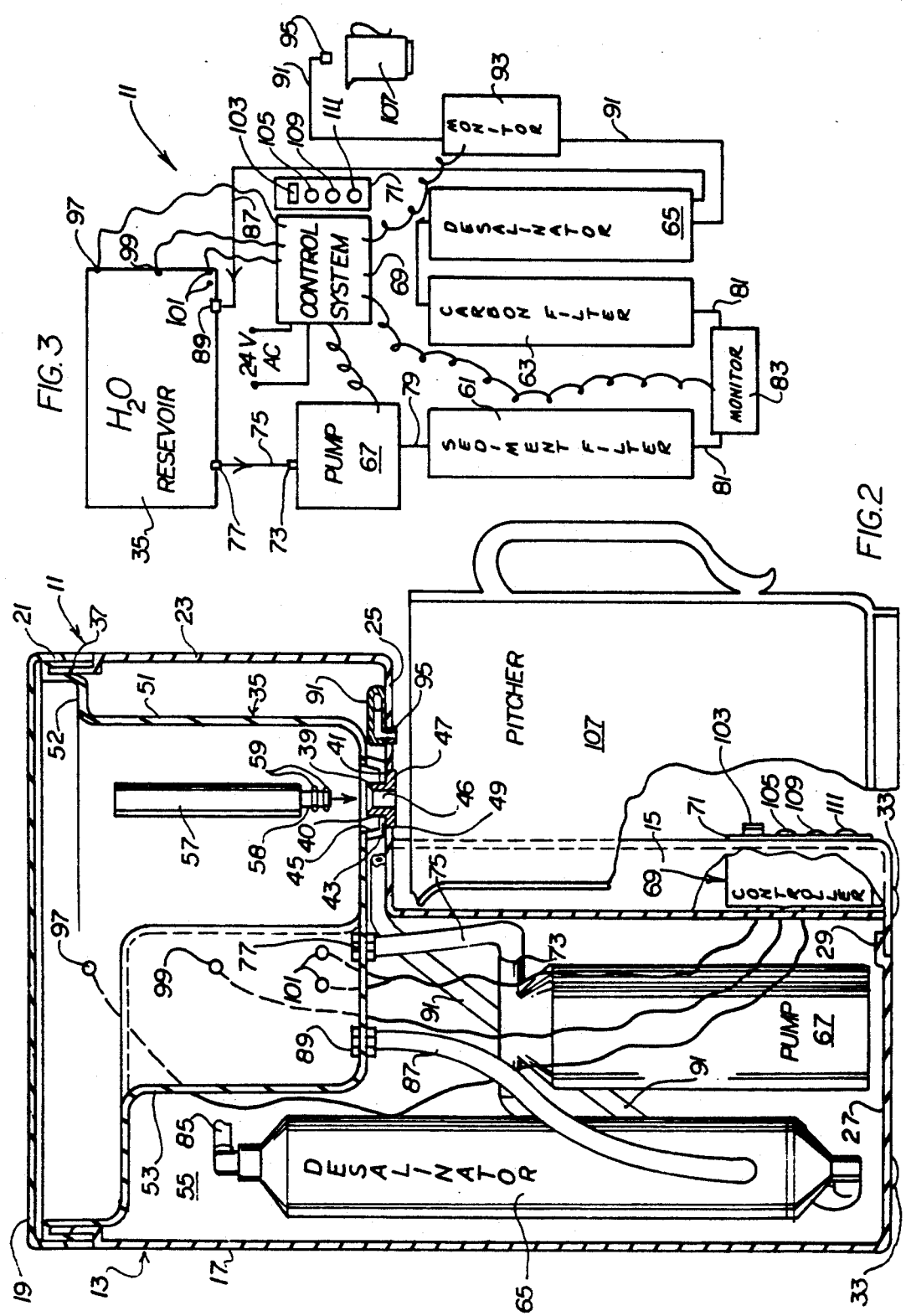

REVERSE OSMOSIS WATER PURIFIER

This invention relates to water-purification apparatus, and more particularly to apparatus for counter-top use or the like for supplying a measured quantity of potable water in a home or other domestic environment.

BACKGROUND OF THE INVENTION

Reverse osmosis has proved to be a particularly effective separation process for efficiently and effectively providing good-tasting, potable water for drinking, cooking and the like. A variety of different apparatus have been developed for utilizing cartridges of spirally-wound reverse osmosis membranes to provide such potable water. U.S. Pat. No. 4,713,175 to Donald T. Bray is an example of such a water purifier that is designed to mount to the spout or spigot of a kitchen faucet and that delivers product water to a receptacle located on or near the sink-top. U.S. Pat. No. 4,711,723 to Donald T. Bray is an example of a water-purification apparatus which is designed to stand on the sink-top or counter-top and to operate whenever it receives water under pressure from a sink faucet or diverter or from some other supply of tap water.

Although the foregoing apparatus have proved very effective for supplying domestic households and the like with potable water, improved and more convenient apparatus are continually being sought to satisfy consumer needs and preferences.

SUMMARY OF THE INVENTION

The present invention provides a water-purification apparatus which utilizes a reverse osmosis cartridge to supply a measured amount of water, e.g. a quantity which substantially fills a pitcher or other receptacle of desired size. The apparatus is free-standing and needs no connection to a source of water under pressure, such as a sink faucet spout or the like. The apparatus conserves water by continuing to recycle the feedwater until it reaches a total dissolved solids (TDS) content indicative of relatively high salinity such that the remaining feedwater should be discharged to waste, and an electrical control system is provided which halts operation when the TDS content of the feedwater reaches such an undesirably high value that continued operation might injure the reverse osmosis membrane. The system also determines when the reverse osmosis membrane cartridge is no longer functioning to adequately remove a desired minimum proportion of dissolved salts and should be replaced in order to improve performance.

BRIEF DESCRIPTION OF THE DRAWINGS

FIG. 2 is a side sectional view of the apparatus of FIG. 1 with portions broken away and shown schematically, together with a container disposed to receive product water from the apparatus; and FIG. 3 is a schematic view illustrating the functional interconnection and control of the various components of the apparatus depicted in FIGS. 1 and 2.

DETAILED DESCRIPTION OF THE PREFERRED EMBODIMENTS

Figure 1:
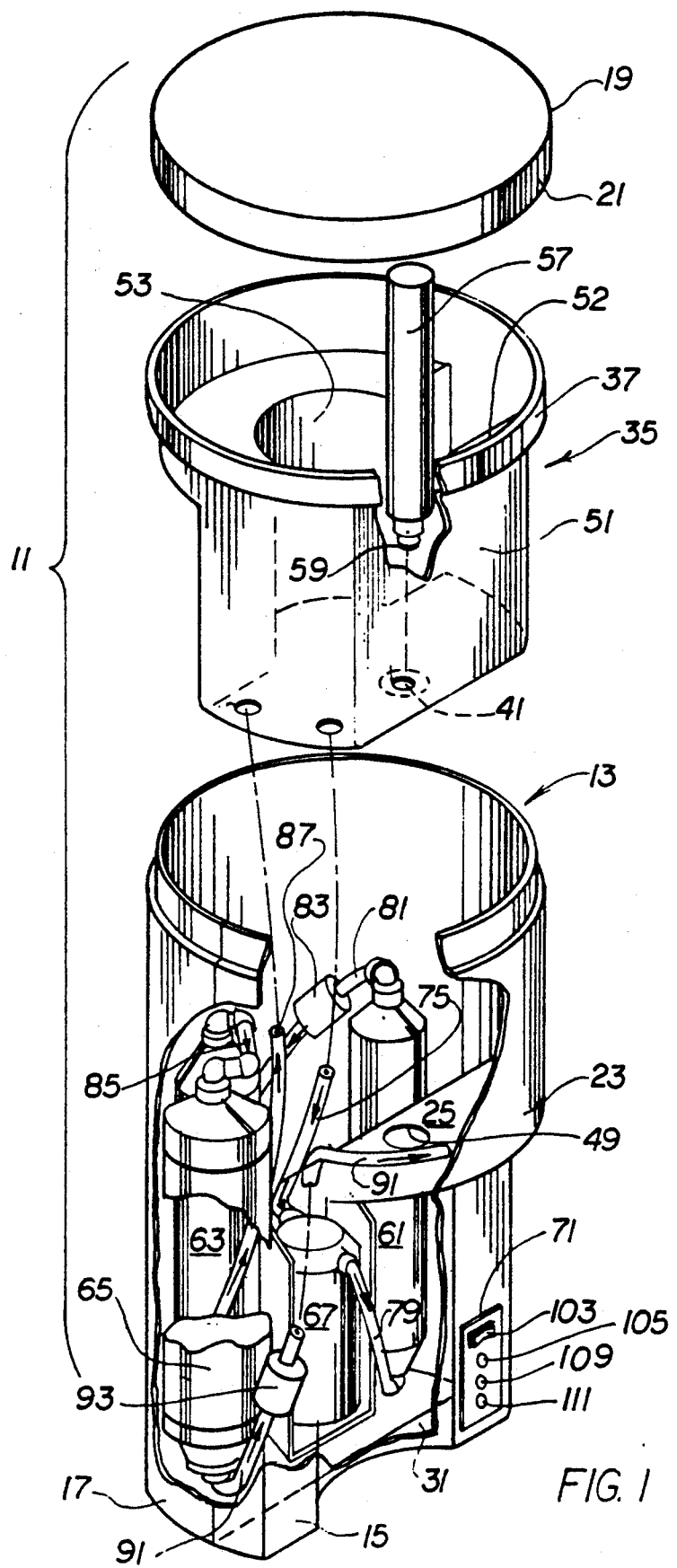
FIG. 1 is an exploded perspective view showing water-purification apparatus embodying various features of the invention.

FIG. 1 illustrates, in an exploded perspective view, a water purification apparatus 11 embodying various features of the invention. The apparatus 11 includes an outer housing 13 which can be made from any suitable structural material but which is conveniently molded from polymeric material in the form of a front section 15 and a rear section 17 which interengage with each other. The upper end of the housing 13 is circular, and its open top is closed by a circular cap 19 which has a short depending tubular skirt 21 which is received in a peripheral recess provided at the upper end of both sections of the housing 13.

The front section 15 of the housing is formed with a forward-extending projection 23 that has a generally flat, horizontal bottom wall 25 which overlies the vacant region or cavity provided therebelow, the housing 13 being so proportioned to provide clearance below the projection for an open-top pitcher or receptacle which will receive the potable water discharged through the bottom wall 25 which is conveyed downward thereinto via gravity. The bottom of the housing 13 is closed by a floor, and a floor section 27 of the rear section 17 of the housing is formed with a recessed flange section 29 (see FIG. 2) which fits inside the rear edge of the front section 15 of the housing which also has a floor section 31. To secure and stabilize the bottom of the housing, the front and rear floor sections can be interconnected by metal clips or screws (not shown) in the region of the recessed flange 29, and a plurality of resilient synthetic plastic or rubber feet 33, for example 4 feet, are preferably provided at spaced-apart locations so that the apparatus will rest stably atop a sink or counter-top.

A feedwater reservoir 35 is provided in the form of a molded polymeric receptacle of irregular shape which is supported from the top peripheral edge of the housing and which extends from the upper end of the housing downward nearly to the bottom wall 25 of the projection 23. The upper end of the feedwater receptacle or reservoir 35 is formed with a perimeter reentrant flange 37 which extends for 360° around the receptacle and fits snugly over the upper edge of the housing 13 as best seen in FIG. 2, thereby uniting the two halves 15 and 17 of the housing. The upper circular cap 19 then fits down over this assembly and is sized to have light frictional contact with the perimeter flange of the receptacle, thereby closing the top of the housing.

The bottom of the reservoir 35 carries a drain fitting 39 (FIG. 2) which has a central tubular portion 40 of a minor outside diameter that fits through a similarly proportioned opening 41 in the bottom wall 43 of a generally circular depression 45 in the floor of the reservoir. The fitting 39 has a central cylindrical channel 46 and an underlying circular flange 47 of larger diameter which is proportioned to be received in a circular opening 49 (FIG. 1) in the bottom wall 25 of the housing projection. The drain fitting 39 is suitably affixed to the exterior surface of the bottom wall 43 of the depression 45 in the reservoir as by establishing a strong adhesive connection which seals the fitting to the bottom wall in the region of the opening so that the only flow out of the depression is through the central discharge channel 46 of the the drain fitting. The front wall 51 of the reservoir is flat and terminates in a horizontal arcuate flange 52 at its upper end, and the rear wall 53 of the reservoir is of irregular shape and provides a generally semiannular open or clearance region 55 (FIG. 2) between it and the upper portion of the wall of the rear section 17 of the housing into which the upper portions of operative components of the apparatus can be accommodated, i.e. the top of these components and associated conduits and interconnections. The presence of the circular depression 45 in the region of the drain likewise provides clearance between the upper surface of the projection bottom wall 25 and the major surface of the bottom of the reservoir 35. When the reservoir 35 is in place, the flat bottom surface 43 of the circular depression rests atop or lies very closely adjacent to the upper surface of the projection bottom wall 25, thereby spacing the remainder of the reservoir thereabove to permit routing of a product water discharge conduit through this region as explained hereinafter. The drain channel 46 is normally closed by an elongated drain plug 57 which has a lower plug element 58 which carries two spaced-apart O-rings 59.

As best seen in FIGS. 1 and 3, the operational system of the water purification unit 11 includes a pair of prefilters, i.e. a sediment filter 61 that is arranged upstream of an activated carbon or charcoal filter 63, a spirally-wound reverse osmosis separation cartridge 65 and a liquid pump 67 that is preferably powered by self-contained electric motor and a control system 69. The control system includes a control panel 71, which is mounted on the front wall of the housing, and associated electrical circuitry and components for determining the level of water in the reservoir and the total dissolved solids (TDS) content of the water in the reservoir and at other locations throughout the apparatus 11.

More specifically, the pump 67 has a suction inlet 73 through which it draws feedwater via a flexible conduit 75 that is connected to a feedwater outlet fitting 77 provided in the bottom of the reservoir 35. A suitable liquidtight bulkhead fitting 77 is employed; such fittings are well known in this art and are advantageously made of molded plastic and carry a circular washer which seals an opening of appropriate size in the reservoir bottom through which it penetrates. The flexible conduit 75 is joined to the outlet fitting 77 in a liquidtight fashion as well known in this art. The conduit is made of suitable material, e.g. ⅜ inch O. D. plastic tubing, such as that sold under the trademark Tygon which is polyvinyl and has a wall thickness of about 0.060 inch, and its other end is suitably joined to the inlet fitting 73 on the pump. The pump 67 can be of any suitable design, reciprocating, peristaltic, centrifugal, etc.; however, preferably a compact, positive displacement, diaphragm pump is used which is powered by an electrical motor that is integrally located within an overall pump body of compact construction. A delivery conduit 79, made of suitable material, such as polyethylene tubing or the like, is connected to a fitting at the discharge or outlet end of the pump 67 and leads to the inlet of the sediment prefilter 61. The sediment prefilter outlet carries a short intermediate conduit 81 which includes a monitor 83 in the form of a pair of electrodes which are in contact with the feedwater flowing therethrough from which sediment has been removed by the sediment prefilter. These electrodes are connected to the control system 69 to monitor the conductivity of the water flowing therethrough, which is a measure of the total dissolved solids (TDS) in the water, as explained hereinafter. The other end of the intermediate conduit 81 is connected to the inlet to the activated carbon prefilter 63. A feed conduit 85 of PE tubing or the like connects the outlet from the carbon prefilter 63 to the inlet to the reverse osmosis separation cartridge 65 which preferably comprises a spirally-wound semipermeable sheetlike membrane arrangement as is well known in this art. U.S. Pat. No. 3,966,616 to Donald T. Bray shows an example of a spirally-wound semipermeable membrane cartridge of this general design which could be employed.

The semipermeable membrane cartridge 65 splits the feedwater stream into two streamlets. A concentrate or brine streamlet of higher TDS content exits from the brine outlet and flows through a return conduit 87 of PE tubing or the like which leads to a return water inlet fitting 89, similar to the feedwater outlet fitting 77 previously described, in the bottom of the reservoir. The product water from the reverse osmosis separation cartridge outlet flows through a product conduit 91 of PE tubing or the like which also contains a monitor 93 which includes a pair of electrodes for monitoring TDS content and leads to a potable water discharge spout 95 that is located in the bottom wall 25 of the projection 23 of the housing. The always-open discharge spout 95 protrudes slightly below the undersurface of the bottom wall 25 of the projection, extending through a suitable opening in which it is frictionally mounted and preferably adhesively attached. The product water conduit 91 is routed through the clearance region provided between the upper surface of the projection bottom wall 25 and the undersurface of the bottom of the water reservoir 35.

To monitor the depth and TDS content of the water in the reservoir 35, 4 electrically conductive small circular electrodes, e.g. made of stainless steel or the like, are sealingly mounted in the sidewall of the reservoir, an upper electrode 97, an intermediate electrode 99 and a pair of side-by-side lower electrodes 101. The uppermost electrode 97 is located at the top of the fill region at about the level of the arcuate ledge 52, and as a result when the water level reaches the electrode 97 so that an electrical circuit is completed through the reservoir between it and one of the lower electrodes 101, it provides an indication that the reservoir is in its full condition. The intermediate electrode 99 is positioned at a second predetermined level appropriately below the upper electrode 97 so that, when the water level in the reservoir 35 drops from the full condition to a level where an electric circuit is no longer completed through the water in the reservoir between the electrodes 99 and 101, a measured quantity of water, e.g. 1 liter, will have been removed from the reservoir. The pair of generally side-by-side electrodes 101 which are located near the bottom of the sidewall of the reservoir are used to monitor the TDS content of the water in the reservoir and to establish an electrical circuit with one of the electrodes 97 and 99 as explained hereinafter.

A low voltage power supply is preferably used for the unit, and preferably standard line voltage is stepped down to 24 volts by a transformer which plugs into a wall socket or the like carrying 112 volts. A 2-conductor standard line or cord carries the power from the transformer to a jack (not shown) provided at a location at the rear of the housing. When electrical power is supplied to the water purification apparatus 11 through the jack, this source of low voltage is connected to the control system which includes an off/on pushbutton switch 103. If the switch 103 is actuated when the reservoir 35 is empty of water or when the water level is below the level of the intermediate electrode 99, no electrical circuit is completed through this electrode, and the control circuitry accordingly causes a "Fill" indicator lamp 105 to be illuminated. Once this occurs, the control system 69 shifts the apparatus into a standby mode until such time as sufficient tap water has been added to the reservoir so that the water level in the reservoir extends upward to the upper electrode button 97. This can be easily visually ascertained, i.e. one simply adds water to fill the reservoir up to the arcuate ledge that is provided near the front-end of the reservoir. Once the water level covers the uppermost electrode button 97, the circuit through this button and one of the lower buttons 101 is completed; this takes the control system 69 out of the standby mode and puts it in a ready mode, which is visually indicated by removing power from the "Fill" lamp and causing the lamp to go out.

The circular cap 19 is then replaced on the housing 13 of the water purification unit, and a pitcher 107 is located below the overhanging projection 23 so that when potable water is discharged from the spout 95, it will flow by gravity into the top of the open-top pitcher or receptacle. With the pitcher in place, the user then pushes the off/on switch 103 twice to activate the control circuitry. Because an electric circuit is now completed through the intermediate electrode 99, power is applied to the electric pump 67, causing the pump to suck feedwater from the reservoir and deliver it under pressure through the sedimentation prefilter 61 and the activated carbon prefilter 63 to the reverse osmosis separation cartridge 65. In the cartridge 65, the stream of water is split into a brine streamlet and a product water streamlet. The brine streamlet flows through the return conduit 87 to the return inlet 89 in the bottom of the reservoir 35 where it mixes with the feedwater remaining in the reservoir. The product water streamlet flows through the product conduit 91 past the monitor 93 and out the discharge spout 95 where gravity directs it downward into the pitcher. The reservoir 35 is sized so that, when the water level drops from the full level covering the upper electrode button 97 to a location where it no longer completes an electric circuit through the intermediate electrode button 99, a measured amount of water which fills the pitcher to a desired level has flowed through the discharge product water spout 95, and at this time, the control circuit disables the electric pump 67 by removing electrical power from the pump thus ceasing operation of the apparatus 11 and turning off any lamps that might be illuminated.

Once the user of the water purification apparatus has consumed all of the pure water produced by this cycle of the apparatus, or otherwise used or stored it so that additional potable water is desired, the apparatus 11 is ready for repeat use as soon as an additional pitcher of tap water is added to the reservoir 35 after removing the circular cap 19. If the off/on switch 103 is actuated without refilling the reservoir, the "Fill" lamp 105 will come on as explained hereinbefore, indicating to the user that the cap 19 should be removed and the level of water in the reservoir 35 should be brought up to the arcuate ledge 52, at which time the "Fill" lamp will go out and the apparatus is ready for operation as indicated hereinbefore.

The apparatus 11 conserves water because it can be operated through several cycles before needing to drain and totally refill the water reservoir 35. It will of course be realized that the water remaining in the reservoir 35 after each successive cycle will be slightly more saline, and therefore the total dissolved solids content of the water in the reservoir is constantly monitored by measuring the conductance of the water by completing a circuit through the pair of side-by-side lower electrode buttons 101. When the resistivity or conductivity of the feedwater reaches a certain value which is indicative that a preset maximum TDS content has been reached, e.g. about 4,000 ppm, at which level the salinity of the feedwater is such that continued operation is considered undesirable because it could cause potential injury to the semipermeable membrane of the reverse osmosis cartridge, the control system 69 is arranged to interrupt the electrical circuit to the pump motor 67 as soon as this certain value is detected. When this occurs, a "Drain" lamp 109 on the control panel below the "Fill" lamp is simultaneously illuminated, and the operation of the water purification apparatus otherwise immediately halts. When the user notices that this has occurred and the "Drain" lamp 109 is illuminated, the potable water in the pitcher is first consumed or otherwise transferred to an appropriate receptacle; then, the draining operation is carried out. With the empty pitcher 107 in place below the overhang of the projection 23, the user removes the circular cap 19 from the housing and lifts the elongated plug 57 vertically upward to the position shown schematically in FIG. 2 so that the lowermost plug element 58 with its two spaced-apart O-rings 59 is lifted from the tubular passageway 46 in the drain fitting, causing the water to drain from the reservoir 35 through this passageway and into the pitcher 107, from which it is then disposed of as waste water. Once the drain plug 57 is replaced and the reservoir 35 is again filled to the ledge 52 with tap water, and the user again actuates the pushbutton switch 103, the "Drain" lamp 109 will go out, and the pump 67 will begin operation for another cycle, producing a measured quantity of potable water as described hereinbefore.

Although a spirally-wound semipermeable membrane separation cartridge will produce many liters of water, it does have a finite useful life, and an indication that it is no longer performing up to standards is evidenced by the fact that the TDS content of the water is no longer being adequately reduced, i.e. by removing at least a certain desired percentage of the TDS content of the feedwater. An appropriate arbitrary purity value is set into the control system 69; for example, it may be desired that the reverse osmosis cartridge 65 should reduce the TDS content of the feedwater by at least 75%, i.e. so that the TDS content of the product water being discharged from the spout 95 has a TDS content of 25% or less than that of the feedwater. To assure that this quality is being maintained, the control system 69 constantly monitors the conductivity of the water flowing in the intermediate conduit 81 between the sediment prefilter 61 and the activated carbon prefilter 63 on its way to the reverse osmosis cartridge, using the monitor 83, and also monitors the conductivity of the product water in the conduit 91 flowing toward the product delivery spout 95, using the monitor 93, and compares one value to the other. When this comparison indicates that the amount of total dissolved solids in the product water has reached a level equal to the preset amount, e.g. 25% of the feedwater stream level, the control circuit illuminates a lamp 111 which is referred to as a "service" lamp. Illumination of the "Service" lamp indicates to the user that the reverse osmosis cartridge 65 is no longer performing up to its design standard and that the water purification apparatus 11 should be serviced by removing and replacing the reverse osmosis cartridge 65.

Thus, a simple-to-operate, efficient and economical water purification apparatus 11 is provided which conserves water by continuously recirculating the brine streamlet until the TDS content of feedwater mixture in the reservoir reaches a high level. This not only saves on the cost of water use, but it helps to conserve an ever-shrinking natural resource. The apparatus is considered to be particularly attractive because it can be very simply operated to create a measured amount of potable water and then shut itself off, until another cycle of water production is desired, without the need for the user to remain in attendance.

Although the invention has been described with regard to a preferred embodiment of the apparatus, it should be understood that various changes and modifications as would be obvious to one having the ordinary skill in this art may be made without departing from the scope of the invention which is defined by the appended claims. Particular features of the invention are emphasized in the claims which follow.

What is claimed is:

1. A reverse-osmosis water-purification apparatus for supplying a desired measured quantity of potable water to an open-top container, which apparatus comprises
   a housing having a pure water dispensing spout,
   a feed water reservoir supported at an upper location in said housing and having a feed water outlet and a return water inlet,
   prefilter means located within said housing and having an inlet and an outlet,
   first conduit means interconnecting said feed water reservoir outlet and said prefilter means inlet,
   a reverse osmosis separation device having a feed water inlet, a product water outlet and a brine outlet,
   second conduit means interconnecting said prefilter means outlet and said reverse osmosis separation device inlet,
   third conduit means interconnecting said product water outlet and said product water dispensing spout,
   fourth conduit means interconnecting said brine outlet and said return water inlet,
   pump means interconnected into one of said conduit means for causing a stream of water to flow from said reservoir through said prefilter means and into said reverse osmosis separation device where said stream is split into 2 streamlets which flow to said spout and return to said reservoir, respectively,
   said reservoir being designed for being filled to a first predetermined level with feed water, and
   control means which includes
      means for determining when the water level within said reservoir drops to a second predetermined level below said first predetermined level, the difference in the volume of water in said reservoir when the water level is at said first predetermined level and when the water level is at said second predetermined level being equal to the desired measured quantity, and
      means connected to said determining means for disabling the operation of said pump means when said water level drops to said second predetermined level, said desired measured quantity of product water being accommodated within said open-top container.

2. Apparatus according to claim 1 wherein said pump means includes an electrical drive motor, and wherein said disabling means automatically removes electrical power from said drive motor when it is determined that the water level in said reservoir has dropped to said second predetermined level.

3. Apparatus according to claim 1 wherein said reservoir and said housing are provided with waste water drain outlets in alignment with each other and wherein removable plug means is provided for closing said drain outlet in said reservoir.

4. Apparatus according to claim 1 wherein said control means include a control panel having a first indicator light and also includes means for illuminating said first indicator light when the water level drops below said second predetermined level.

5. Apparatus according to claim 4 wherein said control means also includes means for determining when the water level within said reservoir reaches said first predetermined level and also includes means for keeping said first indicator light illuminated until said first predetermined water level is again reached.

6. Apparatus according to claim 4 wherein said control means includes means for monitoring the total dissolved solids (TDS) content of the water in said reservoir, and also includes means for disabling the operation of said pump means when said TDS content reaches a pre-set value.

7. Apparatus according to claim 6 wherein said control panel includes a second indicator light and also includes means for illuminating said second indicator light when said TDS content reaches said pre-set value.

8. Apparatus according to claim 6 wherein said control panel includes a third indicator light and wherein said control means includes means for monitoring the TDS content of the feed water flowing toward said reverse osmosis separation device and the TDS content of the product water, for comparing the above-mentioned two TDS contents, and for illuminating said third indicator light when said product water TDS content reaches or exceeds a predetermined percentage of said feed water TDS content.

9. Apparatus according to claim 8 wherein said prefilter means includes a sediment filter and an activated carbon filter and wherein said pump means is connected within said first conduit means and pumps feed water from said reservoir directly to said sediment filter.

10. Apparatus according to claim 9 wherein said monitoring means for monitoring the TDS content of the feed water is located within intermediate conduit means that interconnects said sediment filter and said activated carbon filter.

11. Apparatus according to claim 1 wherein said housing constitutes the exterior of a portable apparatus which is adapted to rest upon a sink or counter-top, and said housing includes an upper horizontal projection which is spaced a sufficient distance above the bottom surface of said housing so that the open-top container for receiving product water can be accommodated vertically below said projection, and wherein said projection has a bottom wall in which said spout is located.

12. Apparatus according to claim 11 wherein a waste water drain outlet is provided in said reservoir in alignment with an opening in said bottom wall of said housing projection, which opening is also aligned above an open-top container located below said projection and wherein manually removable plug means is provided in said reservoir for closing said discharge outlet.

13. Apparatus according to claim 12 wherein said housing include a removable top cover, removal of which provides access to said reservoir and to said removable plug means.

14. A method of providing a measured quantity of potable water in an open-top container, which method comprises withdrawing a stream of feedwater from a reservoir and pumping said withdrawn stream through prefilter means and to a reverse osmosis separation device wherein said stream is split into a brine streamlet and a product water streamlet, returning said brine streamlet to said reservoir, directing said product water streamlet to an elevated outlet where said product water discharges into an open-top container proportioned to hold the desired measured quantity of potable water, determining the level of water in said reservoir to detect when the water level reaches a first predetermined full level and to also detect when the level of water in said reservoir drops below a second predetermined level, the difference in the quantity of water in said reservoir between said full level and said second predetermined level being equal to said desired measured quantity, and automatically halting said pumping to cease further flow of water to said reverse osmosis separation device and to the open-top container when the water level within said reservoir is detected to have fallen below said second predetermined level.

15. A method according to claim 14 wherein the total dissolved solids (TDS) contents of the feedwater in said reservoir is monitored and wherein said pumping is automatically halted when said TDS content of said feedwater reaches a certain preset level.

* * * * *